Aug. 2, 1949.   R. D. DOWNING ET AL   2,477,970
ADJUSTABLE AUGER FOR HARVESTER PLATFORMS
Filed March 27, 1947   2 Sheets-Sheet 1
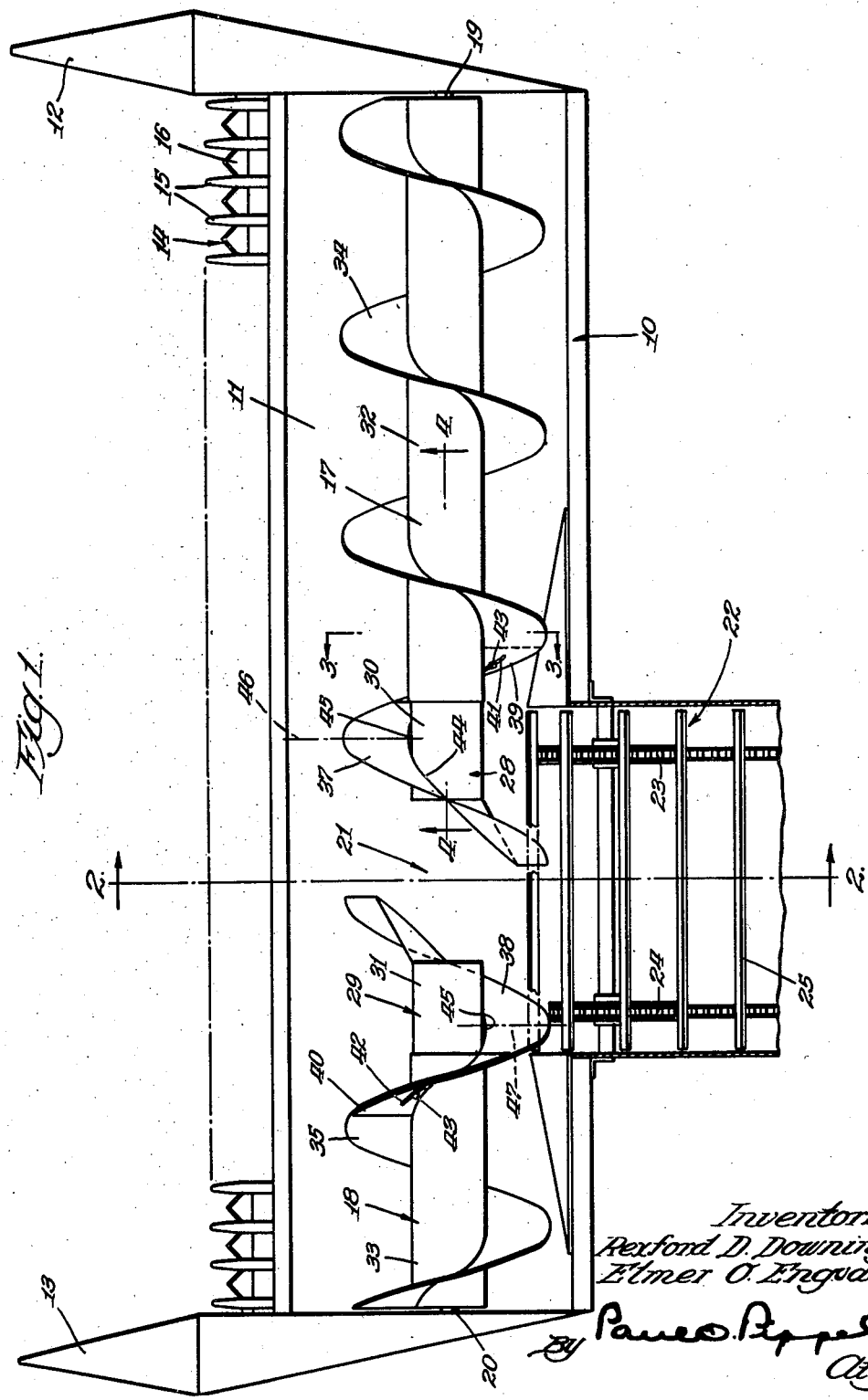

Aug. 2, 1949.    R. D. DOWNING ET AL    2,477,970
ADJUSTABLE AUGER FOR HARVESTER PLATFORMS
Filed March 27, 1947    2 Sheets-Sheet 2
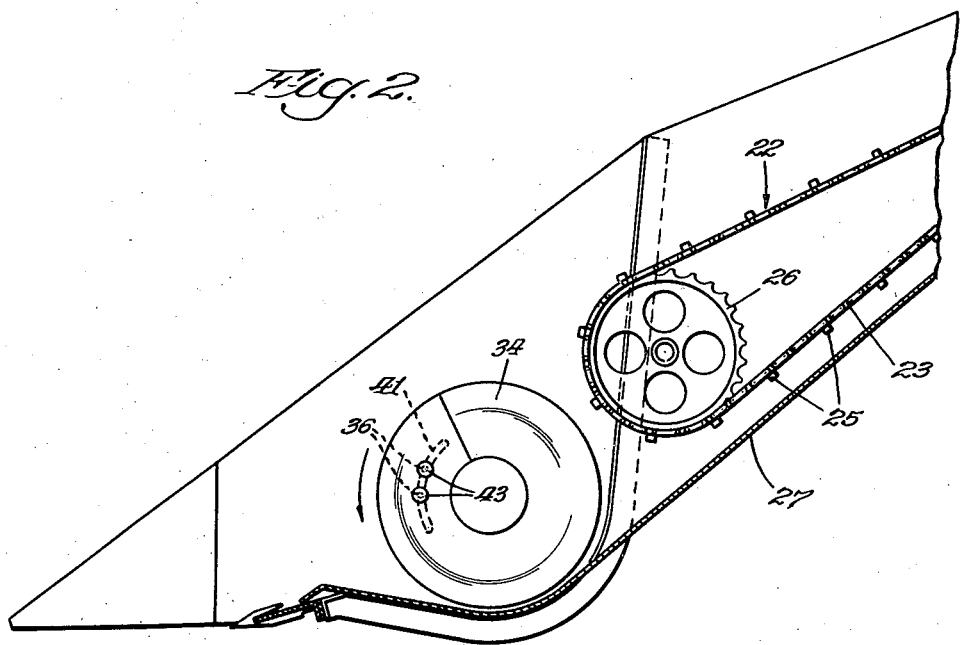
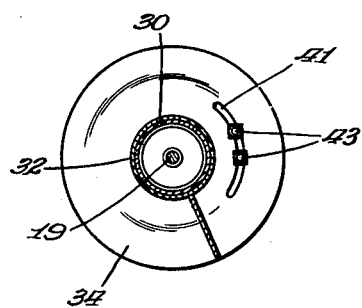
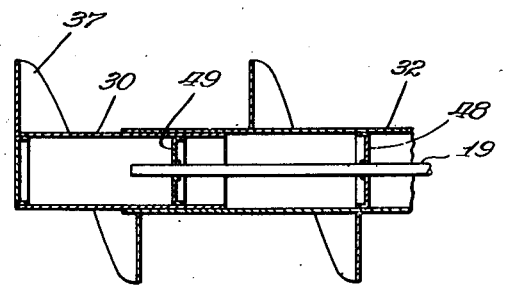
Inventors.
Rexford D. Downing
Elmer O. Zingvall
By Paul O. Pippel
Atty.

Patented Aug. 2, 1949

2,477,970

UNITED STATES PATENT OFFICE 2,477,970

ADJUSTABLE AUGER FOR HARVESTER PLATFORMS

Rexford D. Downing, Rock Island, and Elmer O. Engvall, Moline, Ill., assignors to International Harvester Company, a corporation of New Jersey Application March 27, 1947, Serial No. 737,644

5 Claims. (Cl. 198—213)

This invention relates to a new and improved adjustable auger for harvester platforms in which the length of the auger is extensible.

An important object of this invention is to provide means for adjusting the inner terminal endings of a pair of opposed, cooperative augers feeding to a position centrally therebetween.

Another important object of this invention is to provide a combined telescopic means of lengthening an auger feeding conveyor and slotted and bolt means on the auger flights for fixedly fastening the telescopic extension in any desired position.

This invention is an improvement over the auger extensions shown in the copending application of Stuart D. Pool, filed December 21, 1946, and having Serial No. 717,752. Both of the applications have a common assignee.

Other and further important objects of this invention will become apparent from the disclosures in the following specification and accompanying drawings, in which:

Figure 1 is a top plan view of a harvester thresher platform incorporating the extensible augers of this invention;

Figure 2 is a sectional view taken on the line 2—2 of Figure 1;

Figure 3 is a sectional view taken on the line 3—3 of Figure 1; and

Figure 4 is a sectional view taken on the line 4—4 of Figure 1.

As shown in the drawings, the reference numeral 10 indicates generally a platform for a harvester and more particularly a platform used in conjunction with a harvester thresher. The platform consists of a relatively wide flat portion 11 having end guards in the form of grain dividing points 12 and 13. The forward end of the flat portion 11 is equipped with a sickle 14. The sickle includes stationary guard fingers 15 and a reciprocating cutter bar 16 adapted to sever the grain standing in a field. As the combine or harvester thresher progresses forwardly through a field of standing grain, the sickle severs the grain near the bottom thereof so that the stalk and grain at the top thereof fall rearwardly onto the flat portion 11 of the platform 10. Feeding conveyors in the form of augers 17 and 18 are journaled in the end divider points 12 and 13 on shafts 19 and 20 respectively. The augers 17 and 18 are positioned rearwardly of the sickle 14 and above the flat portion 11 of the platform. As the grain and its accompanying stalk fall rearwardly onto the platform, the augers carry the stalks to a position centrally between the opposed augers as shown at 21. Each of the augers is adapted to be rotated so that they feed grain to the location 21. The augers 17 and 18 have no physical connection between each other and each is unjournaled at its inner end.

Immediately rearwardly of the location 21 is an undershot feed conveyor 22 which is best shown in Figures 1 and 2. The conveyor 22 consists of spaced endless chains 23 and 24 with transversely extending slats or cross bars 25. The conveyor 22 is hinged at its upper end (not shown) and is defined at its lower end by a large sprocket 26 giving it a relatively wide surface at its forward end. When the grain reaches the position 21 between the inner ends of the augers 17 and 18, the diametrically opposite inward extensions cause the grain to be fed inwardly and rearwardly toward the undershot conveyor 22, thus permitting the conveyor to elevate the grain beneath the slats 25 and on the inclined bottom or pan 27 as shown in Figure 2. The particular arrangement of the inner ends of the augers 17 and 18 is shown and described in greater detail in the copending Stuart Pool application mentioned above.

Each of the augers 17 and 18 is equipped with an inner extensible member 28 and 29 respectively. These extensible members 28 and 29 are provided with auxiliary cylindrical drums or cores 30 and 31, and these cores are adapted to telescope within the main cylindrical drum or core portions 32 and 33 of the augers 17 and 18 respectively. The cores 32 and 33 are equipped with flights 34 and 35 which spiral around and are welded or otherwise fastened to the core over the entire length thereof. Near the inner end of the flights 34 and 35 are two holes 36 as best shown in Figure 3, through which a pair of bolts may be positioned. Each of the inner extensible members 28 and 29 have their cores 30 and 31 provided with flights 37 and 38. These are rigidly fastened as by welding to the extreme inner ends of the cores 30 and 31 as shown at 44 and are separated from the cores at their outer ends sufficiently as shown at 45 so that the flight may pass over the larger cores 32 and 33 within which the cores 30 and 31 slidably telescope. These outer extensions of the flights 37 and 38 are shown at 39 and 40 and extend from the dot-dash lines 46 and 47 respectively. Within the flight portions 39 and 40 are elongated slots 41 and 42 in alignment with the holes 36 and spiral in shape to follow the flights. The slots extend in a generally longitudinal direction along the length of the auger. Bolts 43 are adapted to hold the flight ends 39 and 40 fixedly with respect to the flights 34 and 35 of the main portions of the auger. If it should be desired to lengthen the augers so that the inner ends more closely approach each other, the bolts 43 are loosened and the auxiliary cores 30 and 31 of the extensible inner end members are moved out of their telescopic relationship with the main augers 17 and 18, and the bolts 43 retightened in the desired new position. Similarly, the ends of the augers may be spaced a further distance apart in order to accomplish different feeding characteristics of the augers to the undershot conveyor 32.

As best shown in Figure 4, the main core or drum 32 is provided with a disc-like support 48 through which the driving shaft 19 passes. The auxiliary core 30 is equipped with a similar reinforcing disc 49 and when the cores are telescoped the shaft 19 passes through a central opening in the disc 49. This construction contributes to a more rigid feeding auger.

Numerous details of construction may be varied throughout a wide range without departing from the principles disclosed herein, and I therefore do not propose limiting the patent granted hereon otherwise than as necessitated by the appended claims.

What is claimed is:

1. In a feeding auger having a cylindrical main core with a spiral flight fastened to and extending the length thereof, comprising an extensible member, said extensible member including an auxiliary cylindrical core of lesser diameter than the main core, said auxiliary cylindrical core telescopically slidable within said cylindrical main core, a flight fixedly attached to the open end of said auxiliary core and spaced from the auxiliary core at its telescoping end, and means for adjustably fastening the flights together.

2. In a feeding auger having a cylindrical main core with a spiral flight fastened to and extending the length thereof, comprising an extensible member, said extensible member including an auxiliary cylindrical core of lesser diameter than the main core, said auxiliary cylindrical core telescopically slidable within said cylindrical main core, a flight fixedly attached to the open end of said auxiliary core and spaced from the auxiliary core at its telescoping end, means for adjustably fastening the flights together, said means including the flight on the auxiliary core having a generally longitudinally extending slot, the flight on the main core having a hole therein, and bolt means passing through said longitudinally extending slot and the hole, whereby the extensible member may have its core telescope any desired distance and the flights may be attached by the bolt means at any such position.

3. In a platform for agricultural harvesting machines in which opposed augers with screw flights and unjournaled at their inner ends are adapted to feed cut grain to a position intermediate the sides of the platform, comprising extensible members for said augers to vary the distance between the inner ends of the platform augers, said extensible members including central core portions adapted to telescope with the inner ends of the opposed augers, said core portions having screw flights fixedly attached at the inner ends of said extensible members and spaced from said core portions at the other end thereof whereby the core portions may telescope the augers and the screw flights slide over the augers.

4. In a platform for agricultural harvesting machines in which opposed augers with screw flights and unjournaled at their inner ends are adapted to feed cut grain to a position intermediate the sides of the platform, comprising extensible members for said augers to vary the distance between the inner ends of the platform augers, said extensible members including central core portions adapted to telescope within the inner ends of the opposed augers, said core portions having screw flights fixedly attached at the inner ends of said extensible members and spaced from said core portions at the other end thereof whereby the core portions may telescope the augers and the screw flights slide over the augers, and means for adjustably fastening the screw flights of the extensible members and the screw flights of the augers together.

5. In a platform for agricultural harvesting machines in which opposed augers with screw flights and unjournaled at their inner ends are adapted to feed cut grain to a position intermediate the sides of the platform, comprising extensible members for said augers to vary the distance between the inner ends of the platform augers, said extensible members including central core portions adapted to telescope within the inner ends of the opposed augers; said core portions having screw flights fixedly attached at the inner ends of said extensible members and spaced from said core portions at the other end thereof whereby the core portions may telescope the augers and the screw flights slide over the augers, and means for adjustably fastening the screw flights of the extensible members and the screw flights of the augers together, said means including the flight on the auxiliary core having a generally longitudinally extending slot, the flight on the main core having a hole therein, and bolt means passing through said longitudinally extending slot and the hole, whereby the extensible member may have its core telescope any desired distance and the flights may be attached by the bolt means at any such position.

REXFORD D. DOWNING.
ELMER O. ENGVALL.

REFERENCES CITED

The following references are of record in the file of this patent:

UNITED STATES PATENTS

| Number | Name | Date |
|---|---|---|
| 902,530 | Gustavsen | Oct. 27, 1908 |
| 2,118,289 | Birkenbeuel | May 24, 1938 |
| 2,290,806 | Hodgin | July 21, 1942 |
| 2,292,934 | Fitch | Aug. 11, 1942 |
| 2,360,776 | Kozak | Oct. 17, 1944 |
| 2,390,680 | Ausherman | Dec. 11, 1945 |
| 2,443,942 | Winkler | June 22, 1948 |

FOREIGN PATENTS

| Number | Country | Date |
|---|---|---|
| 559,431 | Great Britain | Feb. 18, 1944 |